(12) United States Patent
Nakayama (10) Patent No.: US 7,314,032 B2
(45) Date of Patent: Jan. 1, 2008

(54) BUTTERFLY VALVE APPARATUS AND MANUFACTURING METHOD OF THE SAME

(75) Inventor: Toshiaki Nakayama, Nisikamo-gun (JP)

(73) Assignee: Denso Corporation, Kariya, Aichi-pref (JP)

( * ) Notice: Subject to any disclaimer, the term of this patent is extended or adjusted under 35 U.S.C. 154(b) by 227 days.

(21) Appl. No.: 11/229,690

(22) Filed: Sep. 20, 2005

(65) Prior Publication Data

US 2006/0086392 A1    Apr. 27, 2006

(30) Foreign Application Priority Data

Oct. 26, 2004    (JP)    ............... 2004-310891

(51) Int. Cl.
*F02M 35/10*    (2006.01)
*B21D 51/16*    (2006.01)
*F16K 1/22*    (2006.01)
*F16K 31/06*    (2006.01)

(52) U.S. Cl. ............... 123/184.55; 29/890.12; 137/595; 251/305

(58) Field of Classification Search ......... 123/184.53, 123/184.55, 184.56, 184.61, 583; 137/595; 251/305; 29/890.12, 890.127
See application file for complete search history.

(56) References Cited

U.S. PATENT DOCUMENTS 6,382,162 B2    5/2002    Umino et al.
6,763,802 B1 *  7/2004    Brassell ............... 251/305
6,868,825 B2    3/2005    Suzuki

FOREIGN PATENT DOCUMENTS

| CN | 1479003 A | 3/2004 |
|---|---|---|
| EP | 0 686 793 A1 | 12/1995 |
| JP | 59-76731 | 5/1984 |
| JP | 61-6648 | 1/1986 |

* cited by examiner

Primary Examiner—Noah P. Kamen
(74) Attorney, Agent, or Firm—Nixon & Vanderhye P.C.

(57) ABSTRACT

A butterfly valve apparatus includes a valve body, valve discs, valve shafts, and a connecting member. The valve body has valve passages. Valve discs are respectively arranged in the valve passages. Valve shafts are supported by the valve body such that the valve shafts are aligned substantially in the axial direction of the valve shafts. The plurality of valve shafts respectively support the valve discs. The connecting member connects the valve shafts, which are adjacent to each other. The valve shafts are formed of metal. The connecting member is formed of resin. The valve shafts, which are adjacent to each other, form a gap therebetween in the axial direction of the valve shafts. The valve shafts are connected by forming the connecting member.

14 Claims, 11 Drawing Sheets

BUTTERFLY VALVE APPARATUS AND MANUFACTURING METHOD OF THE SAME

CROSS REFERENCE TO RELATED APPLICATIONS

This application is based on and incorporates herein by reference Japanese Patent Application No. 2004-310891 filed on Oct. 26, 2004.

FIELD OF THE INVENTION

The present invention relates to a butterfly valve and a manufacturing method of the butterfly valve. More particularly, the present invention relates to a butterfly valve for a variable intake apparatus of an internal combustion engine and a manufacturing method of the butterfly valve.

BACKGROUND OF THE INVENTION

A conventional variable intake apparatus variably changes a length of an intake passage in accordance with rotation speed of an internal combustion engine to enhance a torque performance of the engine. Specifically, intake air is distributed to either a main passage, which accommodates a valve disc of the butterfly valve, or a bypass passage, through which intake air bypasses the butterfly valve, in a conventional variable intake apparatus, so that the length of the intake air passage is changed in the butterfly valve apparatus.

According to JP-U-61-6648 and JP-U-59-76731, a butterfly valve apparatus includes multiple valve discs, which are respectively supported by multiple valve shafts. The valve shafts are connected with each other, so that the valve discs can be integrally rotated. Furthermore, the valve shafts are connected with each other via spring pins and blade springs, so that thermal expansion arising in the valve shafts is absorbed. Thus, the valve discs can be restricted from causing a disorder.

However, in the structures of the JP-U-61-6648 and JP-U-59-76731, the spring pins and blade springs need to be assembled to the outer peripheries of adjacent valve shafts by hands in narrow spaces between adjacent valve discs. Therefore, time needed for connecting the valve shafts may increase, and total manufacturing time of the butterfly valve may increase.

SUMMARY OF THE INVENTION

In view of the foregoing and other problems, it is an object of the present invention to produce a butterfly valve apparatus and a manufacturing method of the same, such that manufacturing time of the butterfly valve apparatus can be decreased and valve disc can be restricted from causing a disorder.

According to one aspect of the present invention, a butterfly valve apparatus includes a valve body, a plurality of valve discs, a plurality of valve shafts, and at least one connecting member. The valve body has a plurality of valve passages. The plurality of valve discs is respectively arranged in the plurality of valve passages. The plurality of valve shafts is supported by the valve body. The plurality of valve shafts is aligned substantially in an axial direction of the plurality of valve shafts. The plurality of valve shafts respectively supports the plurality of valve discs. The at least one connecting member connects the plurality of valve shafts with each other. The plurality of valve shafts is formed of metal. The at least one connecting member is formed of resin. The plurality of valve shafts includes two valve shafts that are adjacent to each other in an axial direction of the two valve shafts. The two valve shafts, which are adjacent to each other, form a gap therebetween in the axial direction of the two valve shafts. The two valve shafts are connected by forming the at least one connecting member.

A variable intake apparatus includes an intake manifold and the butterfly valve apparatus. The intake manifold has a plurality of branched passages branched from each other. Each branched passage communicates with each valve passage.

A method for manufacturing the butterfly valve apparatus includes a valve disc forming process, a valve body forming process, and a connecting member forming process. The plurality of valve discs is formed of resin in the valve disc forming process in such a manner that the plurality of valve discs is respectively supported by the plurality of the valve shafts. The valve body is formed of resin in the valve body forming process in such a manner that the valve body supports the plurality of valve shafts. The plurality of valve shafts forms the gap therebetween in the axial direction of the plurality of valve shafts. The at least one connecting member is formed of resin in the connecting member forming process in such a manner that the at least one connecting member connects the plurality of valve shafts, which are adjacent to each other. The connecting member forming process is proceeded after substantially simultaneously proceeding with the valve disc forming process and the valve body forming process.

In the above structure and method, the plurality of valve discs supported by the plurality of valve shafts can be restricted from causing a malfunction due to misalignment, which is caused by thermal expansion and thermal shrinkage, with respect to the plurality of valve passages. Furthermore, time needed for connecting the plurality of valve shafts can be reduced compared with conventional structures, in which plurality of valve shafts are connected with each other using spring pins or blade springs. Thus, manufacturing time for the butterfly valve apparatus and the variable intake apparatus can be reduced.

BRIEF DESCRIPTION OF THE DRAWINGS

The above and other objects, features and advantages of the present invention will become more apparent from the following detailed description made with reference to the accompanying drawings. In the drawings:

FIG. 1A is a crosssectional side view showing a butterfly valve apparatus.

DETAILED DESCRIPTION OF PREFERRED EMBODIMENTS

First Embodiment

As shown in FIGS. 1A, 1B, 2, and 3, a variable intake apparatus 10 is mounted in an air intake system, through which intake air is supplied to a V-eight engine of a vehicle, for example. The variable intake apparatus 10 includes an intake manifold 12 and a butterfly valve 20.

Figure 2:
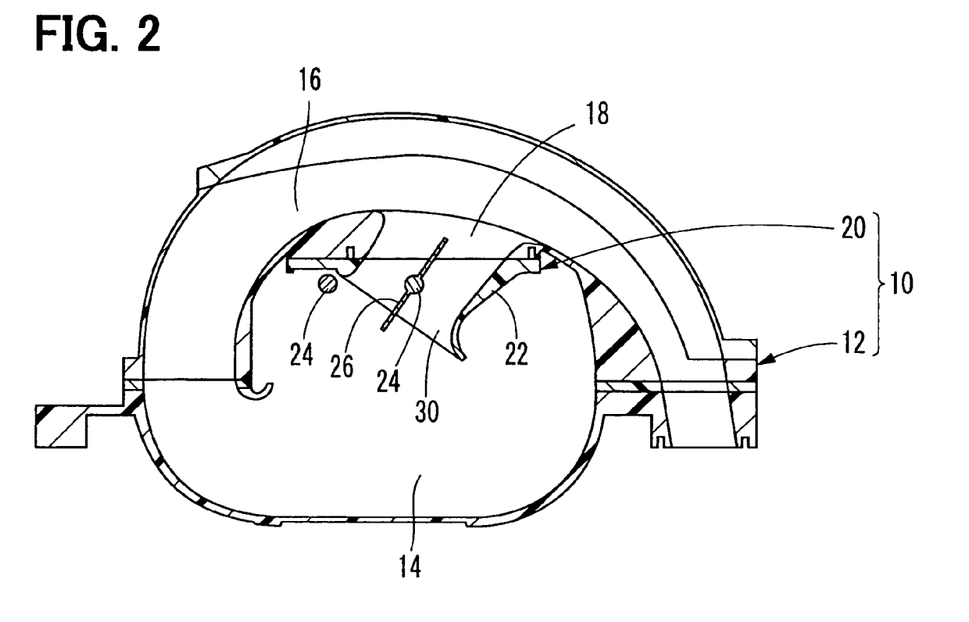
FIG. 2 is a crosssectional side view showing a variable intake apparatus accommodating the butterfly valve apparatus, which is opened, according to the first embodiment.
Figure 3:
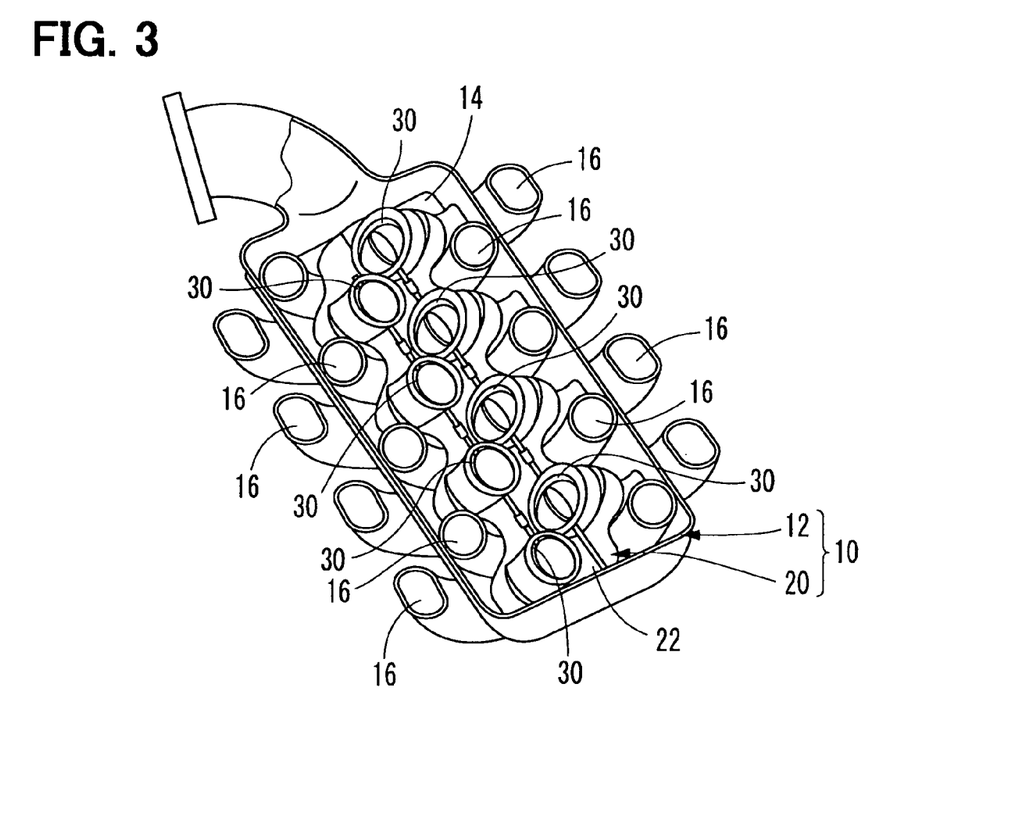
FIG. 3 is a perspective view showing the variable intake apparatus, according to the first embodiment.

The intake manifold 12 includes a surge tank 14, a low-revolution passage 16, and a high-revolution passage 18. The surge tank 14 communicates with a passage downstream of a throttle valve in the intake passage, through which intake air passes after flowing through an air cleaner.

Eight of the low-revolution passages 16 and eight of the high-revolution passages 18 are provided corresponding to the number of cylinders of the engine. The low-revolution passages 16 and the high-revolution passages 18 construct branched passages of the intake manifold 12. Each upstream end of the low-revolution passage 16 communicates with the surge tank 14. Each downstream end of the low-revolution passage 16 communicates with corresponding cylinder of the engine.

Eight of valve passages 30 of the butterfly valve apparatus 20 respectively communicate with the surge tank 14. Each upstream end of the high-revolution passage 18 communicates with corresponding valve passage 30. Each downstream end of the high-revolution passage 18 communicates with a midway of corresponding low-revolution passage 16.

Figure 4:
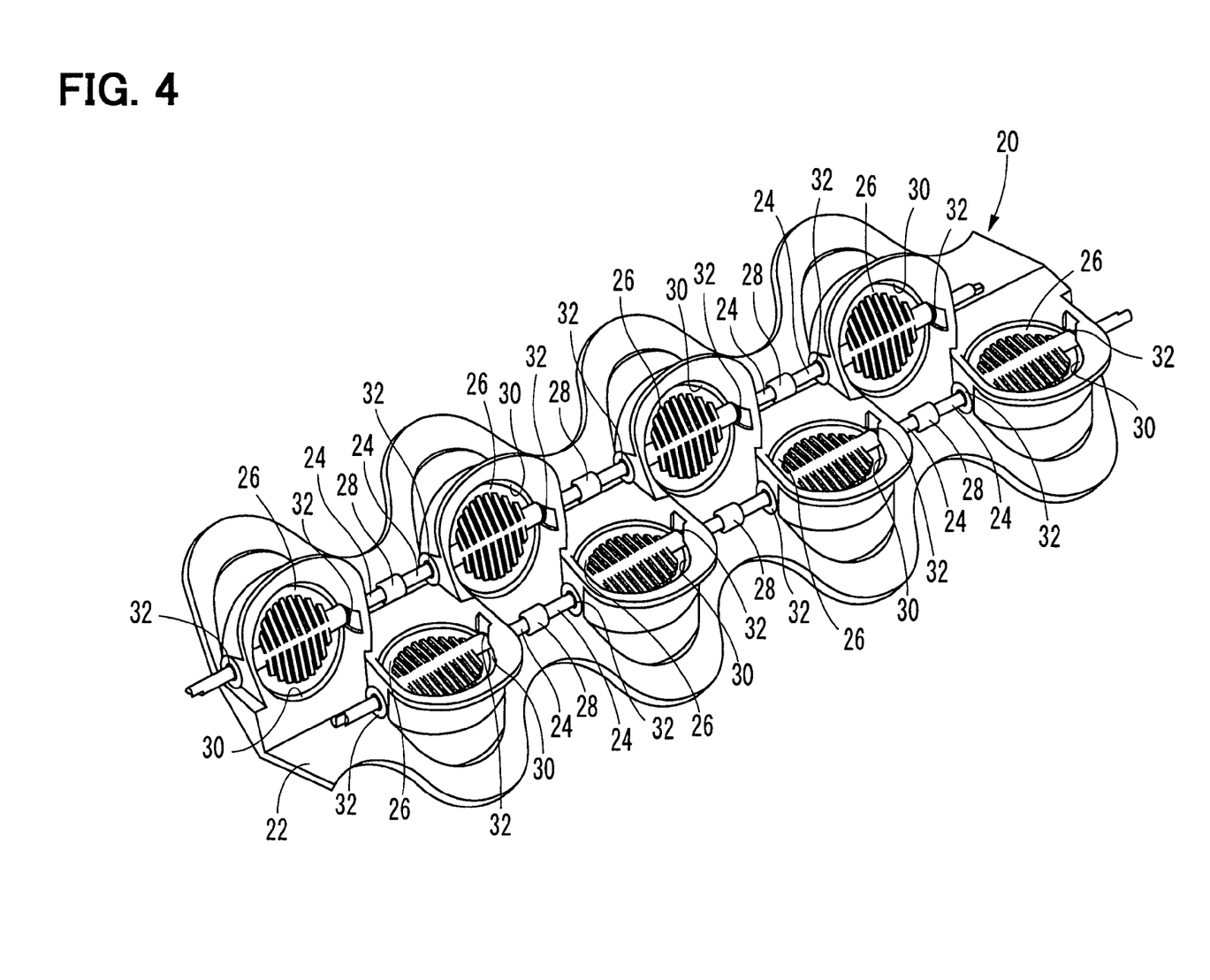
FIG. 4 is a perspective view showing the butterfly valve apparatus, according to the first embodiment.

As shown in FIGS. 2, 4, the butterfly valve apparatus 20 is constructed of a valve body 22, valve shafts 24, valve discs 26, connecting members 28, and the like.

The valve body 22 is formed of resin. The intake manifold 12 accommodates the valve body 22 therein, such that the intake manifold 12 is fixed to the valve body 22. The valve body 22 includes the valve passages 30, which are respectively formed in substantially cylindrical shapes. Four of the valve passages 30 are drawn up in two lines. The upstream end of each valve passage 30 communicates with the surge tank 14. The downstream end of each valve passage 30 communicates with corresponding high-revolution passage 18. Eight of the valve shafts 24 are respectively formed of metal to be in a substantially round bar shape. Each valve shaft 24 is supported by metallic bearings 32 in the valve body 22, such that the valve shaft 24 passes through corresponding valve passage 30. Each valve disc 26 is formed of resin to be in a disc-shape. The valve disc 26 is arranged in corresponding valve passage 30. Each valve disc 26 is secured to corresponding valve shaft 24 passing through the valve passage 30. Four valve shafts 24 respectively pass through four valve passages 30 arranged to be substantially in one row. The four valve shafts 24 are substantially coaxially arranged in the axial direction thereof. The four valve shafts 24, which are adjacent to each other, are connected via the connecting member 28 therebetween. Thereby, the four valve discs 26 are supported by the four valve shafts 24, so that the four valve shafts 24 and the four valve discs 26 are integrally rotatable.

Next, a connecting structure of the valve shafts 24 and the connecting members 28 is described.

Figure 1A:
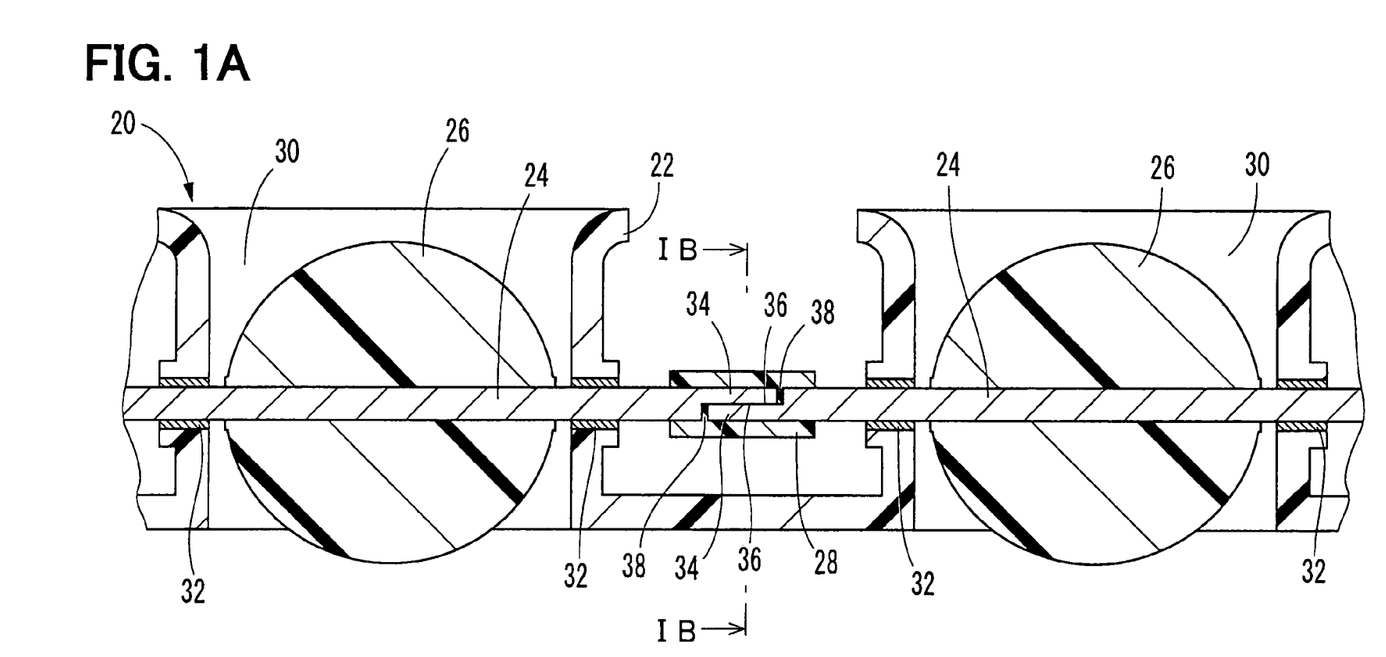
Figure 1B:
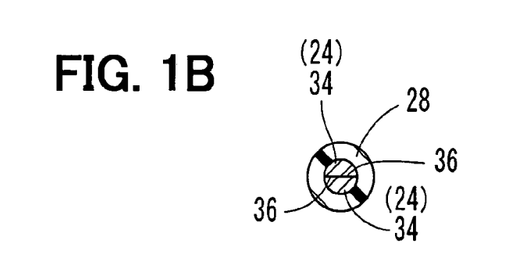
FIG. 1B is a crosssectional side view showing a valve shaft of the butterfly valve apparatus taken along the line IB-IB in FIG. 1A, according to a first embodiment of the present invention.

As shown in FIG. 1, each end of the valve shafts 24 has a coupling portion 34. The coupling portion 34 has a crosssectional face, which is substantially perpendicular to the axis of the valve shaft 24. The crosssectional face of the coupling portion 34 is in a substantially semicircular shape. Each coupling portion 34 has a flat face 36, which forms a chord of the semicircular cross section of the coupling portion 34. The coupling portions 34 of the valve shafts 24, which are adjacent to each other, engage with each other along the radial direction thereof, such that the flat faces 36 contact face to face with each other.

The coupling portions 34, which are adjacent to each other, form a gap 38 therebetween in the axial direction thereof. Each flat face 36 of the coupling portion 34 is substantially in parallel with the axis of the valve shaft 24. The outer peripheries of the valve shafts 24, which are adjacent to each other, are covered with the connecting member 28, which is formed of resin, so that the adjacent valve shafts 24 are connected with each other. The resinous material forming the connecting member 28 is interposed in the gap 38 formed between the adjacent valve shafts 24, so that connecting strength between the adjacent connecting members 28 is enhanced. The resinous material forming the connecting member 28 may be selected as appropriate. For example, the resinous material of the connecting member 28 may be selected from generally known materials, such as polyamide, being reasonably elastic.

Figure 5:
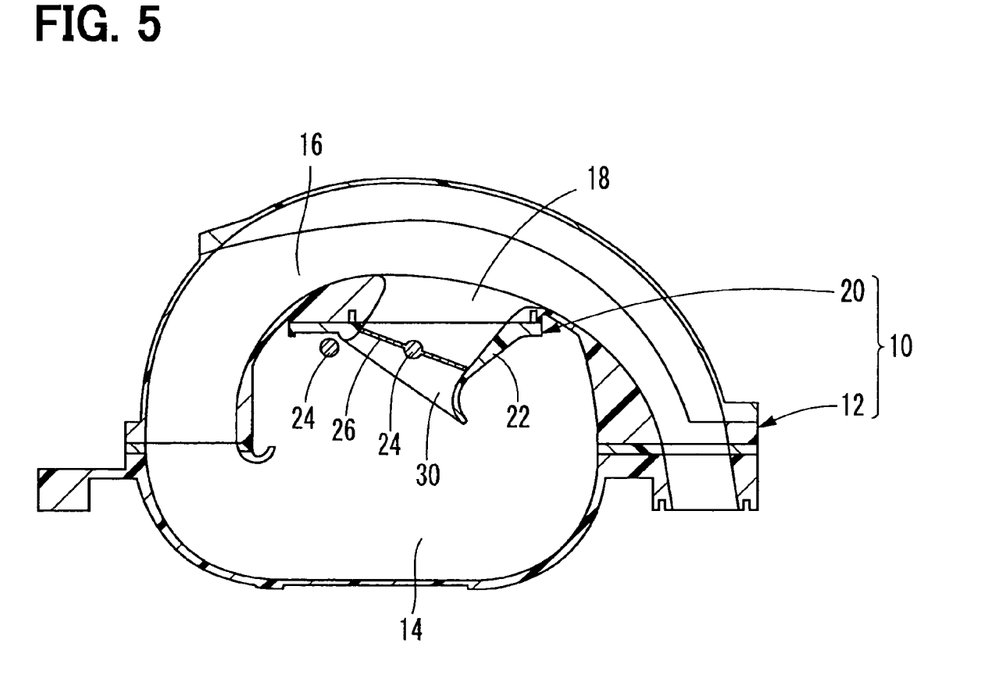
FIG. 5 is a crosssectional side view showing the variable intake apparatus accommodating the butterfly valve apparatus, which is substantially closed, according to the first embodiment.

A flow amount of intake air is controlled using the throttle valve. The intake air flows into the surge tank 14 in this variable intake apparatus 10 after passing through the throttle valve. As shown in FIG. 5, when each valve passage 30 is closed by corresponding valve disc 26, intake air flowing into the surge tank 14 is supplied into corresponding cylinder of the engine though corresponding low-revolution passage 16. As referred to FIG. 2, when each valve disc 26 opens corresponding valve passage 30, intake air flowing into the surge tank 14 is supplied into corresponding cylinder of the engine though the valve passage 30 and the high-revolution passage 18, in which flow resistance is smaller than flow resistance in the low-revolution passage 16.

The length of the flow path of the low-revolution passage 16 is larger than the length of the flow path of both the valve passage 30 and the high-revolution passage 18. Therefore, an amount of intake air respectively supplied into the cylinders changes corresponding to opening and closing the valve passages 30 using the valve discs 26.

Figure 6:
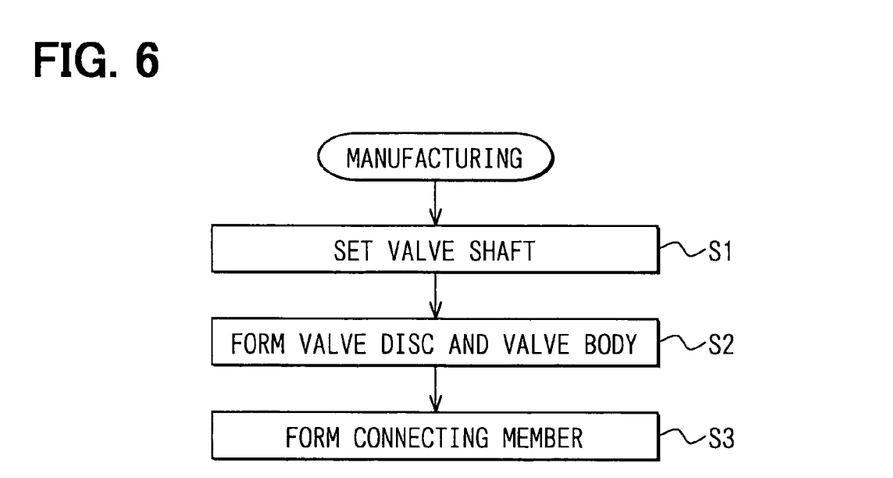
FIG. 6 is a flowchart showing a process for manufacturing the butterfly valve, according to the first embodiment.
Figure 7:
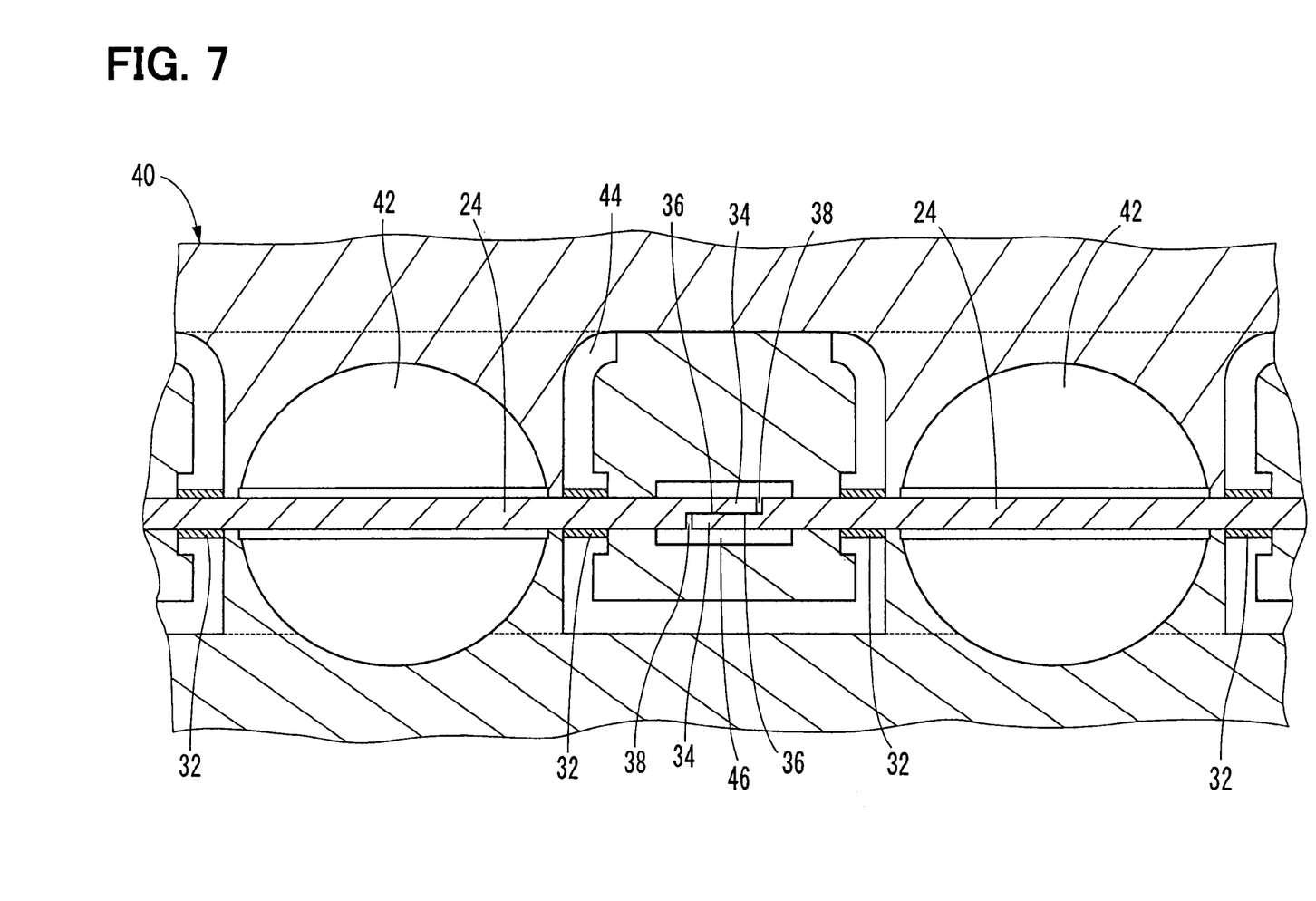
FIG. 7 is a crosssectional side view showing cavities formed in dies for forming the butterfly valve apparatus, according to the first embodiment.

Next, an example of a manufacturing method of the butterfly valve apparatus 20 used in the variable intake apparatus 10 is described in reference to FIG. 6. In step S1, as shown in FIG. 7, the metallic valve shafts 24, to which the bearings 32 are respectively assembled, are set in forming dies 40, such that four of the metallic valve shafts 24 are arranged to be in two rows. Subsequently, the forming dies 40 are tightly closed. In this condition, the valve shafts 24, which are axially adjacent to each other, are arranged such that the adjacent valve shafts 24 axially form the gap 38 therebetween and the flat faces 36 of the coupling portions 34 contact face to face with each other.

Figure 8:
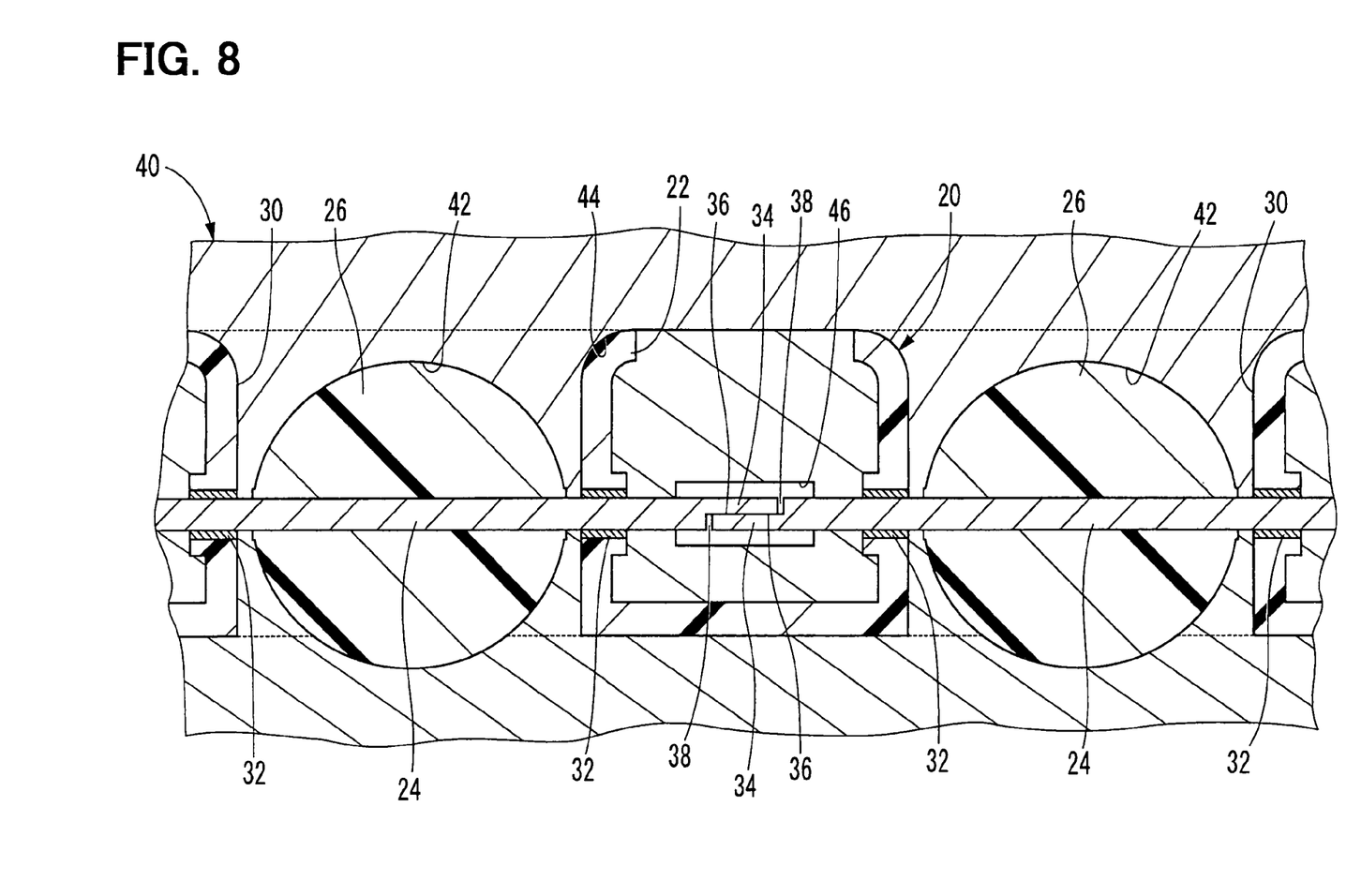
FIG. 8 is a crosssectional side view showing the cavities partially filled with a material in the dies, according to the first embodiment.

Next, in step S2, as shown in FIG. 8, an injection apparatus injects molten resin into the forming dies 40 to substantially simultaneously form the eight valve discs 26 and the valve body 22. Specifically, the forming dies 40 form a first cavity 42 and a second cavity 44 at predetermined locations therein. Subsequently, molten resin is injected into the first cavity 42 and the second cavity 44. When the molten resin injected into the first cavity 42 and the second cavity 44 is cooled to be lower than the grass-transition temperature thereof, the molten resin is solidified, and the routine proceeds to step S3.

Figure 9:
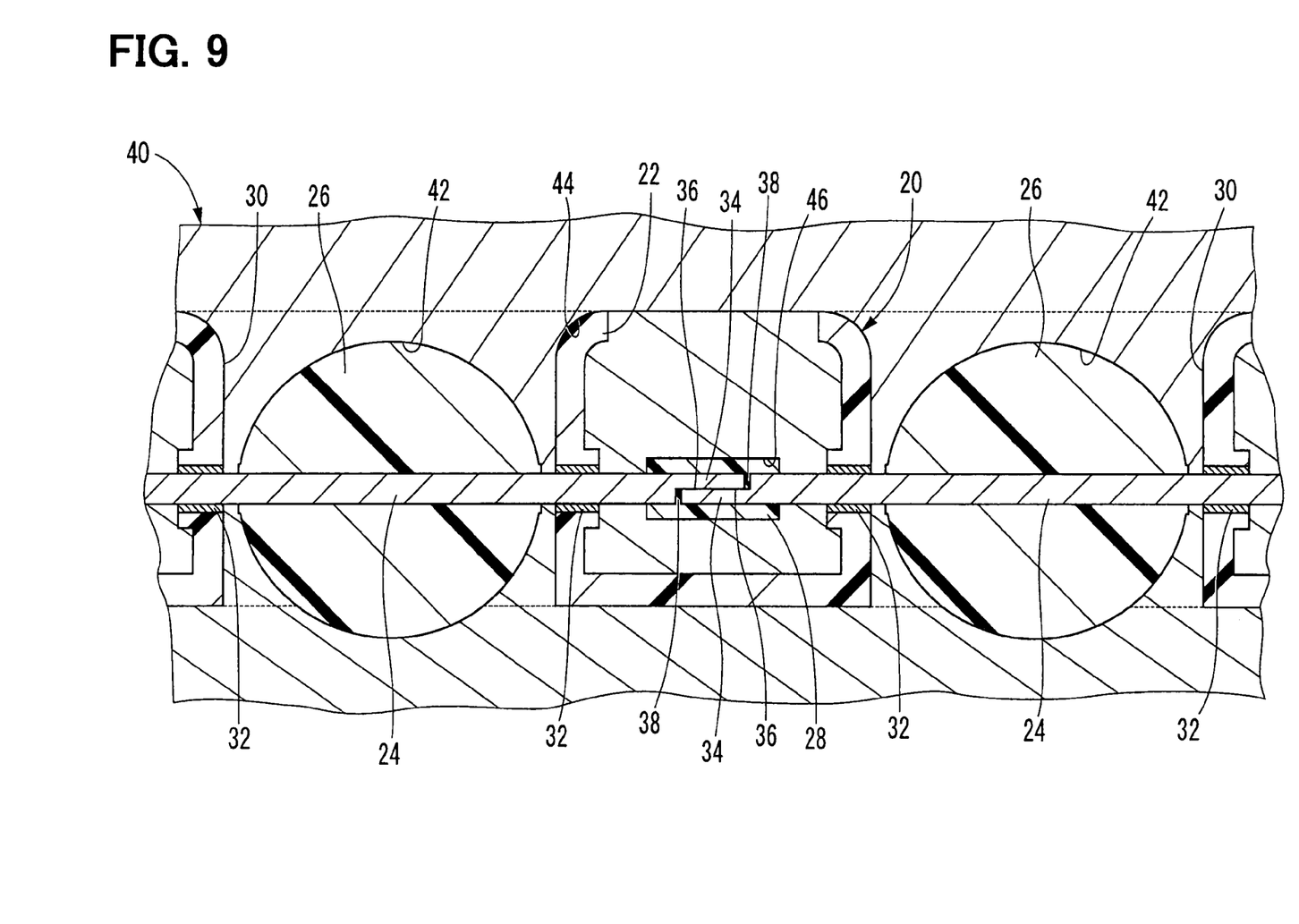
FIG. 9 is a crosssectional side view showing the cavities substantially entirely filled with the material in the dies, according to the first embodiment.

In step S3, as shown in FIG. 9, the injection apparatus injects molten resin into the forming dies 40 to substantially simultaneously form six of the connecting members 28. Specifically, the forming dies 40 form a third cavity 46 for forming the connecting members 28 at predetermined locations to surround the coupling portions 34 of the valve shafts 24. The injection apparatus injects molten resin into the third cavity 46. When the molten resin injected into the third cavity 46 is cooled to be lower than the grass-transition temperature thereof, the molten resin is solidified, and the forming dies 40 is opened. Subsequently, the butterfly apparatus 20 is removed from the forming dies 40 to be a product.

In this embodiment, each valve disc 26 and each valve body 22 are substantially simultaneously formed of resin. In this case, an amount of thermal expansion of each valve shaft 24 is apt to be large. However, each connecting member 28 is formed after the valve disc 26 and the valve body 22 are formed, so that each valve shaft 24 is connected after the valve shaft 24 is cooled to thermally shrink.

Furthermore, even in the case where the axially adjacent metallic valve shafts 24 thermally expand when the connecting member 28 is formed of resin to connect the valve shafts 24, the axially adjacent metallic valve shafts 24 are arranged to form the gap 38 therebetween and the valve shafts 24 are cooled earlier than resin, so that the metallic valve shafts 24 are allowed to thermally shrink in the axial direction thereof. Thus, the valve shafts 24 are connected with each other in the condition where the valve shafts 24 sufficiently thermally shrink. That is, the valve shafts 24 are connected with each other in the condition where a dimensional variation of the valve passages 30 is absorbed by axial displacement of the valve shafts 24 caused by thermal shrinkage thereof. Therefore, the valve discs 26 supported by the valve shafts 24 can be restricted from causing a malfunction due to misalignment with respect to the valve passages 30, for example. Furthermore, in this embodiment, the valve shafts 24 are connected by forming the connecting members 28 of resin. Therefore, time needed for connecting the valve shafts 24 can be reduced compared with conventional structures, in which valve shafts are connected with each other using spring pins or blade springs. Thus, manufacturing time for the butterfly valve apparatus 20 can be reduced, so that manufacturing time for the variable intake apparatus 10 can be reduced.

Furthermore, the valve shafts 24, which are axially adjacent to each other via the gaps 38, may cause thermal shrinkage corresponding to variation in peripheral temperature in such a range between −40° C. and 120° C. in a condition where the variable intake apparatus 10 is used. However, even in this condition, thermal shrinkage can be absorbed by elastic deformation arising in the connecting members 28. Thus, the valve discs 26 can be restricted from causing a malfunction in the condition where the variable intake apparatus 10 is used.

In this embodiment, the coupling portions 34 of the adjacent valve shafts 24 engage with each other in the radial direction thereof, and the coupling portions 34 are covered with the connecting members 28. Thereby, the adjacent valve shafts 24 can be restricted from causing torsion with respect to each other in the condition where the variable intake apparatus 10 is operated. Therefore, the four valve shafts 24, which are connected with each other via the connecting members 28, and the four valve discs 26, which are supported by the four valve shafts 24, can be integrally rotated synchronously with each other.

Second to Fourth Embodiments

Figure 10:
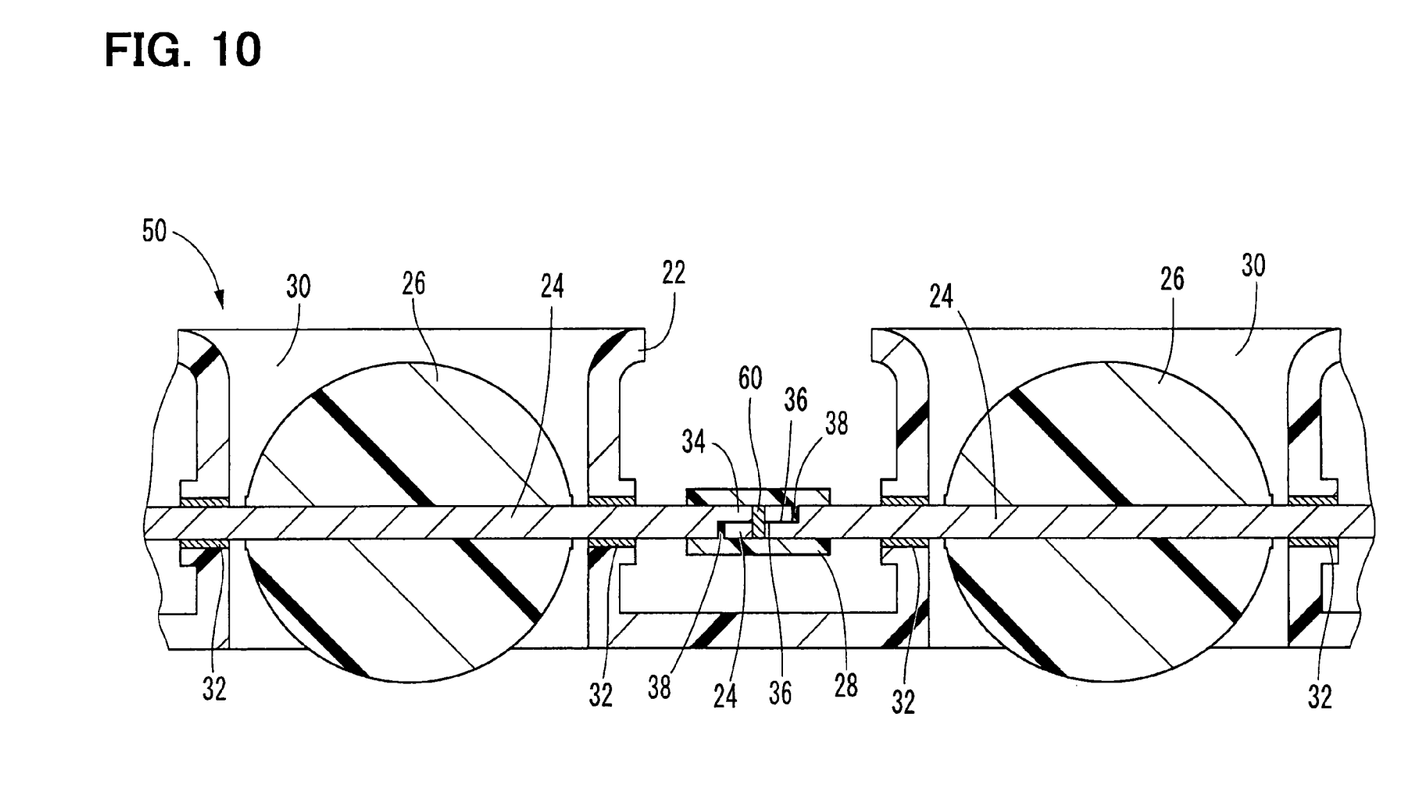
FIG. 10 is a crosssectional side view showing a butterfly valve apparatus, according to a second embodiment of the present invention.

As shown in FIG. 10, a parallel pin 60 penetrates the coupling portions 34 of the valve shafts 24, which are adjacent each other, in the radial direction of the valve shafts 24 in a butterfly valve apparatus 50 in the second embodiment.

Figure 11:
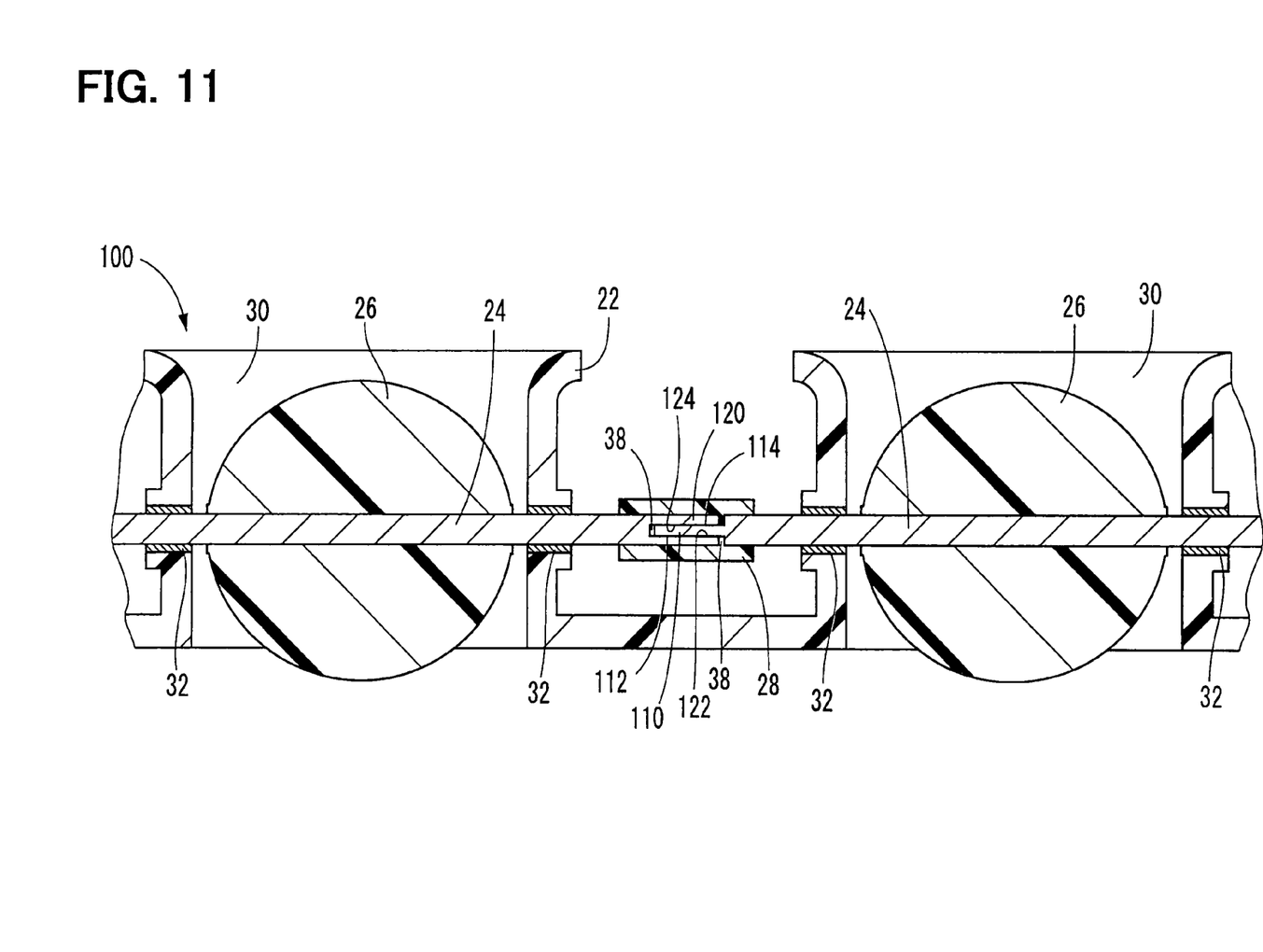
FIG. 11 is a crosssectional side view showing a butterfly valve apparatus, according to a third embodiment of the present invention.

As shown in FIG. 11, two of the valve shafts 24, which are adjacent to each other, respectively have coupling portions 110, 120 in a butterfly valve apparatus 100 in the third embodiment. One coupling portion 110 of one valve shaft 24 engages with the other of the coupling portion 120 of the other of the valve shaft 24. The coupling portion 110 of one valve shaft 24 has a width across flat structure. Specifically, the coupling portion 110 of one valve shaft 24 has substantially flat outer faces 112, 114, which are substantially in parallel with each other. The substantially flat outer faces 112, 114 are radially apart from each other for the width across flats thereof. Thus, the outer faces 112, 114 of the coupling portion 110 respectively contact with inner peripheries 122, 124 of the coupling portion 120 face to face, so that the coupling portions 110, 120 radially engage with each other.

Figure 12:
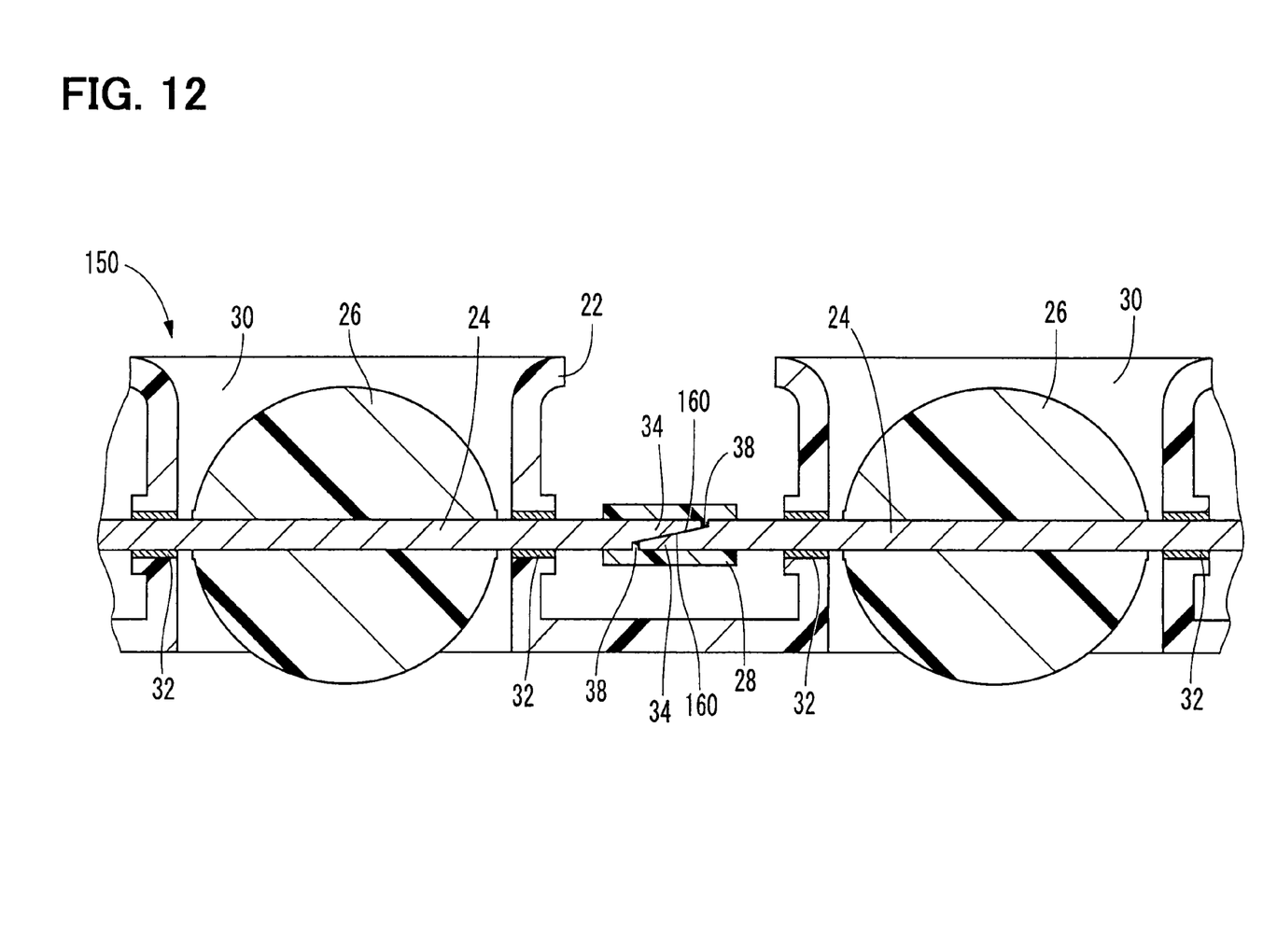
FIG. 12 is a crosssectional side view showing a butterfly valve apparatus, according to a fourth embodiment of the present invention.

As shown in FIG. 12, coupling portions 34 of the valve shafts 24 respectively have flat faces 160, which are inclined with respect to the axis of the valve shafts 24, in a butterfly valve apparatus 150 in the fourth embodiment. Specifically, each flat face 160 is inclined to the outer side in the radial direction of the valve shaft 24 toward the end face of the valve shaft 24 (coupling portion 34), in this embodiment. Alternatively, each flat face 160 may be radially inwardly inclined toward the end face of the valve shaft 24. Thus, in the structures of this embodiment, the coupling portions 34 of the valve shafts 24, which are adjacent to each other, radially engage with each other, such that the flat faces 160 contact with each other face to face.

In the above second to fourth embodiments, the metallic valve shafts 24, which are axially arranged via the gap 38 therebetween, are connected by forming the connecting member 28. Therefore, the structures of the above second to fourth embodiments can produce effects similar to the effect of the first embodiment.

Variation

Figure 13:
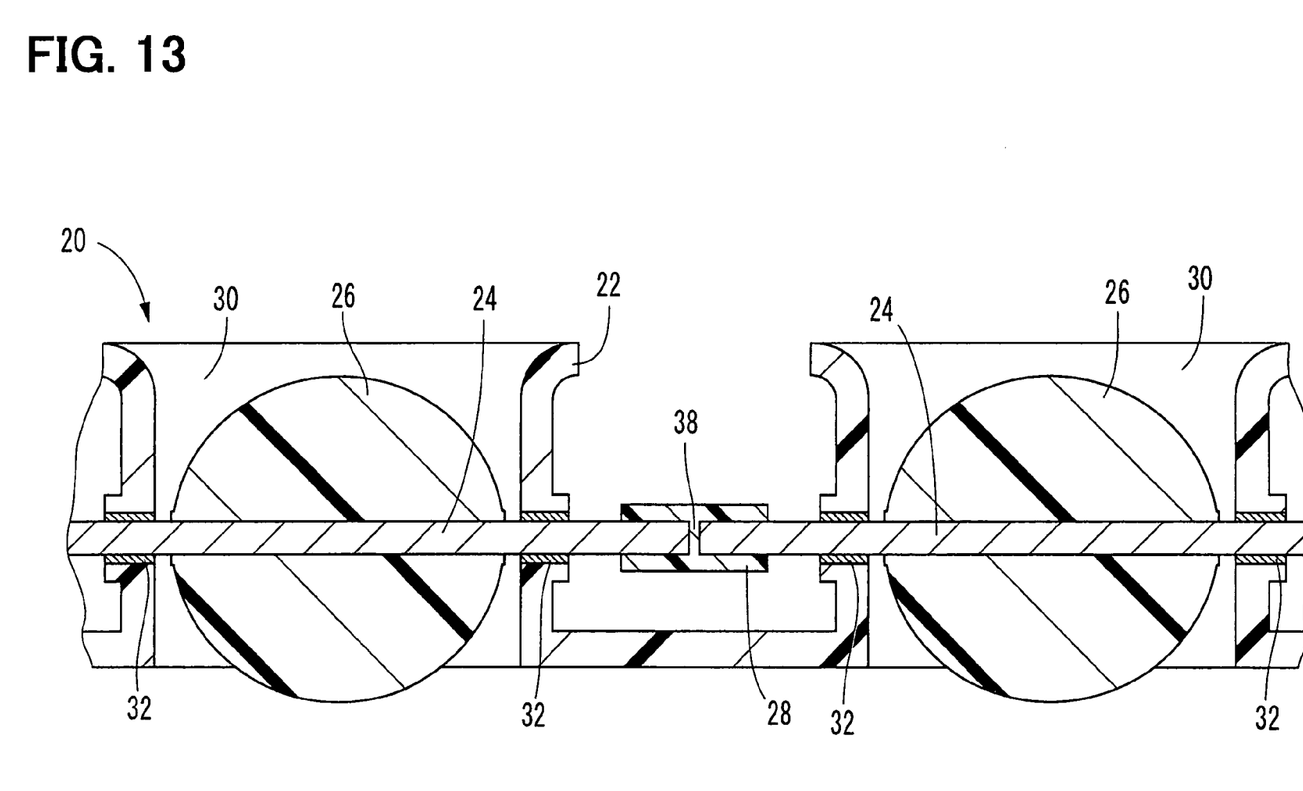
FIG. 13 is a crosssectional side view showing a butterfly valve apparatus, according to a variation of the first embodiment of the present invention.

The present invention is not limited to the above embodiments. For example, as shown in FIG. 13, the gap 38 may be axially formed between adjacent end faces of the valve shafts 24, without forming the coupling portions 34 in the adjacent valve shafts 24.

The numbers of all the passages 16, 18 of the variable intake apparatus 10, the passage 30 of the butterfly valve apparatus 20, the valve shafts 24, the valve discs 26, and the connecting members 28 may be modified as appropriate in accordance with the number of the cylinders of the engine, for example.

The butterfly valve apparatus 20 may be used as at least a part of an apparatus provided to an exhaust system of the engine, in addition to or instead of the variable intake apparatus 10 provided to the intake system of the engine, for example.

In the above structures, the connecting member is formed of resin such that the connecting member fills the gap axially between the valve shafts, which are axially adjacent to each other. Therefore, strength of the connecting portion between the adjacent valve shafts can be enhanced.

The order of the forming processes of the valve disc, the valve body, and the connecting member may be different from the order of the above embodiment. For example, the forming processes of the valve disc, the valve body, and the connecting member may be performed in this order. Alternatively, the forming processes of the valve body and the connecting member may be simultaneously performed after finishing the forming process of the valve disc.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A butterfly valve apparatus comprising:
   a valve body that has a plurality of valve passages;
   a plurality of valve discs that is respectively arranged in the plurality of valve passages;
   a plurality of valve shafts that is supported by the valve body, the plurality of valve shafts being aligned substantially in an axial direction of the plurality of valve shafts, the plurality of valve shafts respectively supporting the plurality of valve discs; and
   at least one connecting member that connects the plurality of valve shafts with each other,
   wherein the plurality of valve shafts is formed of metal, the at least one connecting member is formed of resin, the plurality of valve shafts includes two valve shafts that are adjacent to each other in an axial direction of the two valve shafts,
   the two valve shafts, which are adjacent to each other, form a gap therebetween in the axial direction of the two valve shafts, and
   the two valve shafts are connected by forming the at least one connecting member.

2. The butterfly valve apparatus according to claim 1, wherein the at least one connecting member is formed of resin that has elasticity.

3. The butterfly valve apparatus according to claim 1, wherein the at least one connecting member fills the gap formed between the two valve shafts, which are adjacent to each other in the axial direction of the two valve shafts.

4. The butterfly valve apparatus according to claim 1, wherein the at least one connecting member at least partially surrounds outer peripheries of the two valve shafts, which are adjacent to each other.

5. The butterfly valve apparatus according to claim 1, wherein the two valve shafts, which are adjacent to each other, engage with each other in a radial direction of the plurality of valve shafts.

6. A variable intake apparatus comprising:
   an intake manifold that has a plurality of branched passages branched from each other; and
   the butterfly valve apparatus according to claim 1,
   wherein each branched passage communicates with each valve passage.

7. A method for manufacturing the butterfly valve apparatus according to claim 1, the method comprising:
   forming the plurality of valve discs of resin in a valve disc forming process in such a manner that the plurality of valve discs is respectively supported by the plurality of the valve shafts;
   forming the valve body of resin in a valve body forming process in such a manner that the valve body supports the plurality of the valve shafts, the plurality of valve shafts, which are adjacent to each other, forming the gap therebetween in the axial direction of the plurality of valve shafts; and
   forming the at least one connecting member of resin in a connecting member forming process in such a manner that the at least one connecting member connects the plurality of valve shafts, which are adjacent to each other,
   wherein the connecting member forming process is proceeded after substantially simultaneously proceeding with the valve disc forming process and the valve body forming process.

8. A method for manufacturing the butterfly valve apparatus, the method comprising:
   setting a plurality of the valve shafts in a cavity formed in forming dies in a valve shaft setting process in such a manner that the plurality of valve shafts is aligned substantially in an axial direction of the plurality of valve shafts, two of the plurality of valve shafts, which are adjacent to each other in the axial direction of the plurality of valve shafts, forming a gap therebetween,
   forming a plurality of valve discs of resin in a valve disc forming process in such a manner that each valve disc is secured to each valve shafts;
   forming a valve body of resin in a valve body forming process in such a manner that the valve body rotatably supports the plurality of the valve shafts; and
   forming at least one connecting member of resin in a connecting member forming process in such a manner that one of the at least one connecting member connects the two of the plurality of valve shafts, which are adjacent to each other,
   wherein the valve shaft setting process is proceeded before proceeding with all the valve disc forming process, the valve body forming process, and the connecting member forming process, and
   the connecting member forming process is proceeded after substantially simultaneously proceeding with the valve disc forming process and the valve body forming process.

9. The method according to claim 8,
   wherein the valve body is formed to have a plurality of valve passages in the valve body forming process, and the plurality of valve discs is formed such that each valve disc is arranged in each valve passages of the valve body in the valve disc forming process.

10. The method according to claim 8,
wherein the plurality of valve shafts is formed of metal, and the two valve shafts, which are adjacent to each other, are connected by forming the one of the at least one connecting member of resin in the connecting member forming process.

11. The method according to claim 8, wherein the at least one connecting member is formed of resin that has elasticity.

12. The method according to claim 8, wherein the one of the at least one connecting member fills the gap formed between the two valve shafts, which are adjacent to each other, in the connecting member forming process.

13. The method according to claim 8, wherein the one of the at least one connecting member is formed to at least partially surround outer peripheries of the two valve shafts in the connecting member forming process.

14. The method according to claim 8, wherein the valve shaft setting process includes a valve shaft engaging process, in which the two valve shafts, which are adjacent to each other, are engaged with each other in such a manner that the two valve shafts are fixed with respect to a radial direction of the plurality of valve shafts.

* * * * *